3,014,036
Patented Dec. 19, 1961

3,014,036
2-AMINO-3-QUINOLYL-1-PROPANOL DERIVATIVES

John R. E. Hoover, Glenside, Pa., assignor to Smith Kline & French Laboratories, Philadelphia, Pa., a corporation of Pennsylvania
No Drawing. Filed Nov. 20, 1959, Ser. No. 854,275
2 Claims. (Cl. 260—287)

This invention relates to novel 2-amino-3-quinolyl-1-propanol derivatives having chemotherapeutic activity and to intermediates for preparing them. More particularly this invention relates to compounds having antibacterial activity for instance against *Staphylococcus aureus*, *Klebsiella pneumoniae*, *Diplococcus pneumoniae*, *Proteus vulgaris*, *Micrococcus pyogenes* var. *aureus* or *Escherichia coli*. These compounds have the following fundamental formula:

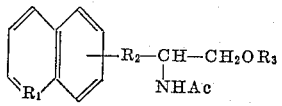

in which $R_1$ is

 or 

$R_2$ represents carbonyl $$\text{>C=O)}$$

or hydroxymethylene $$\text{>CHOH)}$$

$R_3$ is hydrogen or acyl groups particularly alkanoyl groups of from 2 to 18 carbon atoms and Ac represents lower alkanoyl groups of 2 to 4 carbon atoms for instance acetyl or, preferably halogenated by a halogen of atomic weight of less than 80 such as dichloroacetyl. The compounds especially those in which $R_2$ is carbonyl are particularly active antifungal agents such as against *Candida albicans*, *Trichophyton mentagrophytes*, *Trichophyton rubrum*, *Microsporum audouini* or *Microsporum canis*. The compounds are particularly active against the Gram-positive organisms mentioned.

Particularly advantageous compounds are those in which Ac is dichloroacetyl, $R_3$ is hydrogen and the alkyl chain is positioned at the 6-position in the quinoline moiety.

The starting materials for the propanediol derivatives of this invention are prepared by the following reactions:

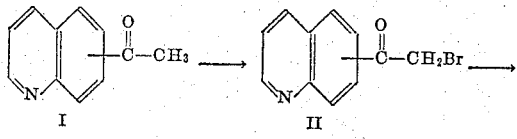

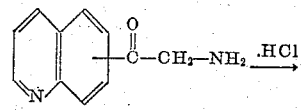

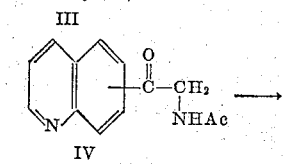

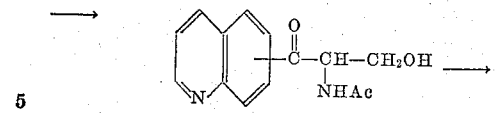

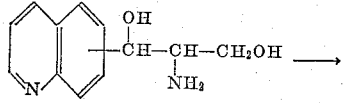

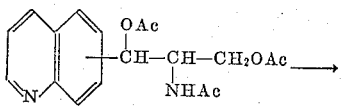

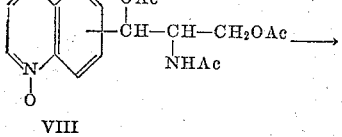

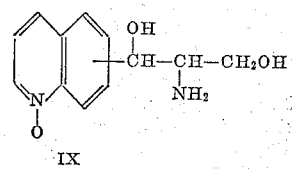

in which formulas Ac is as described above but preferably is acetyl.

The quinolinyl bromomethyl ketone of Formula II is prepared by bromination of the known acetylquinolines and is then aminated through the hexamethylene quaternary salt. The primary amine (III) is N-acylated and reacted with formaldehyde in methanol with sodium carbonate to form 2-acylamino-2-quinoloyl-1-ethanol of Formula V. Reduction with aluminum isopropoxide gives 2-acylamino-1-quinolyl-1,3-propanediol (VI). In forming the quinoline N-oxide analogues, this compound, exhaustively acylated, is oxidized with monoperphthalic acid in ether solution to form the desired analogue (VIII). Either quinolyl-2-amino propanediol (VI or IX) is then converted into the desired N-acylated compound by monoacylation preferably in the haloacetyl series by reaction with the methyl or ethyl ester for instance ethyl or methyl dichloroacetate at reflux in methanol. Alternatively an acid chloride or anyhydride in the presence of base is used in stoichiometric amounts. The O-esters are then prepared by reacting an acyl chloride with the alcohol in the calculated amount in an excess of pyridine or in dimethylformamide with a slight excess of pyridine.

The compounds of this invention have advantageously a solubilizing group in their structure namely the basic quinoline or the N-oxide quinoline moieties thereby rendering them chemically distinct from the known analogues available previously.

It will be apparent to one skilled in the art that the free quinoline bases of this invention have a basicity sufficient to form therapeutically acceptable nontoxic acid addition salts with acids especially strong inorganic acids such as hydrochloric, sulfuric, etc. acids. One skilled in the art will also recognize that many of the compounds described may exist in isomeric form, particularly those having a hydroxymethylene group adjacent to the quinoline moiety. All such isomers are included in this invention since the mixtures obtained as described have substantial chemotherapeutic acivity. In the hydroxy series described both the DL-threo and DL-erythro isomers can be present. From the examples it will be apparent that the threo isomers are usually prepared. The chemical names in the examples are in the threo series unless designated otherwise. The threo forms and particularly the D-threo forms are preferred. The latter can be prepared by resolving the isomeric mixtures particularly the aminopropane diols by known prior art procedures such as by forming the salt of d or l-tartaric acid, d or l-mandelic acid or some similar optically active resolving acid. The mixture of salts is then separated by fractional crystallization such as from a lower aliphatic alcohol or alcohol-water mixtures. The reactions described hereafter are identical for any position or optical isomer having structures similar to those mentioned.

The preparation of the compounds of this invention will be apparent from the description above as well as from the following specific examples.

Example 1

A suspension of 5.5 g. of 6-acetylquinoline in 15 ml. of 48% hydrobromic acid is stirred at hot water temperature while 5.5 g. of bromine is added dropwise. The mixture is cooled and filtered to give the crude 6-quinolyl bromomethyl ketone hydrobromide which is purified by recrystallization from methanol-ether, M.P. 236–237° C. (dec.). This material (4.4 g.) is suspended in water. The cooled aqueous extracts therefrom are neutralized with sodium bicarbonate to separate the free bromoketone which darkens at 115° C. by chloroform extraction.

A chloroform extraction from the neutralization of 30 g. of the bromoketone is filtered into a stirred solution of 62 g. of hexamethylenetetramine in 400 ml. of chloroform. After stirring 1 hour, the mixture is cooled and filtered to give the quaternary salt, M.P. 159–161° C. (dec.). A mixture of 19 g. of the salt in 40 ml. of concentrated hydrochloric acid is stirred for 1 hour, then diluted with 2 volumes of absolute alcohol, cooled and filtered to give crude aminomethyl 6-quinolyl ketone dihydrochloride, M.P. 229–230° C. (dec.). A cooled solution of 50 g. of the hydrochloride in 350 ml. of water is stirred with 40 ml. of acetic anhydride and sodium acetate at pH 5–6. The separated N-acetyl solid is filtered off, washed with water and recrystallized from ethyl acetate, M.P. 120–122° C.

A mixture of 22.8 g. of the N-acetyl compound, 6 g. of paraformaldehyde and 200 ml. of methanol is stirred while 0.6 g. of solid potassium carbonate is added. After stirring for 2 hours at room temperature, the desired 2-acetylamino-2-(6-quinoloyl)-1-ethanol is separated, M.P. 185–187° C.

A solution of 16 g. of redistilled aluminum isopropoxide, 15.6 g. of 2-acetylamino-2-(6-quinoloyl)-1-ethanol and 100 ml. of anhydrous isopropanol is stirred with heating while distilling out acetone (around 6 hours). The mixture is filtered to give a residue which is continuously extracted with ethyl alcohol. Trituration of the alcoholic extracts with ethyl acetate gives 2-acetylamino-1-(6-quinolyl)-1,3-propanediol, M.P. 194–196° C. This compound (9.1 g.) is acetylated with 140 ml. of acetic anhydride at reflux. Concentration leaves a syrup which is dissolved in ice water, neutralized and taken into ethyl acetate. Evaporation of the solvent gives the triacetate, M.P. 106–108° C.

Example 2

A solution of 6.2 g. of the triacetate of Example 1 in 200 ml. of chloroform is treated with 180 ml. of an ether solution of monoperphthalic acid ($3.8 \times 10^{-4}$ equiv./ml.). After oxidation at room temperature for 3 hours, the solvent is concentrated to a half volume, diluted with methanol and passed over the hydroxyl form of an anion exchange resin such as Amberlite IRA–400 (such as U.S. Patent No. 2,591,573 and Example 1 of No. 2,689,833). The eluates are combined and evaporated to give N,O,O-triacetyl-2-amino-1-(6-quinolyl-N-oxide)-1,3-propanediol, M.P. 220–220° C. from absolute ethanol crystallization. The alcoholic filtrate gave a quantity of the mono-N-acetate.

Example 3

A mixture of 1.3 g. of 2-acetylamino-1-(6-quinolyl)-1,2-propanediol (Example 1) and 10 ml. of 1 N hydrochloric acid is heated on the steam bath for 2 hours. Concentrating in vacuo gives the desired 2-amino-2-(6-quinolyl)-1,3-propanediol dihydrochloride, M.P. 258° C. (dec.).

Example 4

A solution of 7.7 g. of the dihydrochloride of Example 3 in methanol is neutralized over an anion-exchange column (Example 2). The methanol eluates with 20 ml. of methyl dichloroacetate are heated at reflux for 1 hour. The next day the solvent is removed to give 2-dichloroacetamido-1-(6-quinolyl)-1,3-propanediol, M.P. 190–192° C. Substituting an excess of methyl chlorodifluoroacetate or methyl fluorodichloroacetate for methyl dichloroacetate in this reaction the corresponding chlorodifluoro- and fluorodichloroacetamides are obtained.

Example 5

A solution of 500 mg. of 2-dichloroacetamido-1-(6-quinolyl)-1,3-propanediol in 25 ml. of pyridine with one molar equivalent of palmitoyl chloride is allowed to stand overnight at room temperature. Quenching in water gives the 3-palmitate ester.

Another portion of 500 mg. of the propanediol with one molar equivalent of valeryl chloride in 25 ml. of pyridine is reacted as above to give the 3-valerate ester.

Another portion of 500 mg. is reacted with one equivalent of acetic anhydride in pyridine to give the 3-acetate.

Example 6

A solution of 1 g. of 2-amino-2(6-quinolyl)-1,3-propanediol and 500 mg. of azidoacetic acid methyl ester in 25 ml. of methanol is heated at reflux for 3 hours. Concentration and cooling gives the desired N-azidoacetyl compound.

Example 7

A solution of 500 mg. of 2-amino-2-(6-quinolyl)-1,3-propanediol, 1 equivalent of bromoacetyl bromide in a mixture of pyridine and benzene is stirred at room temperature for 3 hours. The solution is diluted with water and the organic layers separated to give the N-bromoacetyl derivative.

Example 8

A solution of 2.05 g. of 2-amino-1-(6-quinolyl-N-oxide-1,3-propanediol hydrochloride (prepared as in Example 3, M.P. 234–235° C.) in methanol is passed over the hydroxide form of an anion exchange column as in Example 4 then reacted with 10 ml. of methyl dichloroacetate at reflux for 2 hours. The mixture is concentrated to give the white solid, 2-dichloroacetamido-1-(6-quinolyl-N-oxide)-1,3-propanediol, M.P. 205° C. (dec.).

Example 9

A mixture of 1 g. of 2-dichloroacetamido-1-(6-quinolyl-N-oxide)-1,3-propanediol in 25 ml. of pyridine with 1 molar equivalent of stearoyl chloride is allowed to react overnight then quenched in water to give the O-stearate ester.

Another mixture of 1 g. of the diol with an excess of acetic anhydride in dimethylacetamide and pyridine is allowed to react at room temperature then quenched to give, upon fractional recrystallization the O-monoacetate and the O,O-diacetate esters.

Example 10

A suspension of 2.6 g. of aminomethyl 6-quinolyl ketone dihydrochloride and 10 ml. of α,α-dichloroacetyl chloride is heated at 80° C. for 30 minutes. The cooled mixture is quenched in 50 ml. of ice and water. The aqueous mixture is stirred at room temperature for 1 hour, then made slightly basic with sodium carbonate. The aqueous mixture is extracted into ethyl acetate. The residue from the organic extracts is purified through ether to give α,α-dichloro-N-(6-quinoloylmethyl)acetamide, M.P. 156–157° C. (dec.).

Example 11

A suspension of 1.6 g. of α,α-dichloro-N-(6-quinoloylmethyl)acetamine, 5 ml. of 37% aqueous formaldehyde and a small amount of sodium bicarbonate in 75 ml. of ethyl alcohol is stirred at room temperature for 2 hours. The solution is cooled to give [2-(α,α-dichloroacetamido)-2-(6-quinoloyl)]ethanol, M.P. 190–191° C.

Example 12

A mixture of 500 mg. of the ethanol of Example 11 and a molar equivalent of palmityl chloride in pyridine-ethyl acetate is reacted overnight to give the O-palmitate ester.

Substituting acetyl chloride or myristyl chloride gives the O-acetate or O-myristate ester.

Example 13

Substituting other acyl chlorides such as acetyl or chloroacetyl for the dichloroacetyl chloride of Example 10 then reaction with formaldehyde as in Example 11 gives various [2-acetamido-2-(6-quinoloyl)]ethanol derivatives such as the parent compound or [2-(α-chloroacetamido)-2-(6-quinoloyl)]-ethanol.

Example 14

Substituting 8-quinolyl bromomethyl ketone [J. Am. Chem. Soc., 68, 1844 (1946)] for its 6-isomer in Example 1 and reacting with hexamethylene tetramine gives aminomethyl 8-quinolyl ketone. The N-acetyl compound is then reacted with formaldehyde to form the active [2-acetamido-2-(8-quinoloyl)]ethanol derivatives. These then are reduced, oxidized and acylated as described above to give the 8-isomers.

Example 15

A solution of 2.5 g. of α,α-dichloro-N-(6-quinoloylmethyl)acetamide in 100 ml. of chloroform is treated with 60 ml. of an ether solution of monoperthalic acid (3.8×10⁻⁴ eq./ml.). After standing at room temperature for 5 hours the solvent is concentrated to half volume, diluted with methanol and passed through an ion exchange resin in the hydroxyl form ( e.g. ERA 400 OH). The eluates are evaporated in vacuo to give α,α-dichloroacetamidomethyl-(6-quinolyl-N-oxide)ketone.

A suspension of 1.5 g. of α,α-dichloroacetamidomethyl-(6-quinolyl-N-oxide)ketone and 5 ml. of 37% aqueous formaldehyde in 50 ml. of ethyl alcohol containing a small amount of sodium bicarbonate is stirred at room temperature for three hours. The reaction mixture is diluted with two volumes of water and the methanol stripped off in vacuo. Cooling of the aqueous residue deposits solid [2 - (α,α - dichloroacetamido - 2 - (6 - quinoloyl - N-oxide]ethanol.

Example 16

A suspension of 10 g. of 2-(6-quinoloyl)-2-acetamidoethanol and 24 g. of trityl chloride in 25 ml. of pyridine is allowed to stand at room temperature for five days with occasional mixing. The reaction mixture is then poured over excess ice and allowed to stand until crystallization occurs. The solid is removed and washed with a small amount of ethyl alcohol giving 1-trityloxy-2-acetamido-2-(6-quinoloyl)-ethane, M.P. 119–120° C. This material displays dimorphic crystalline characteristics, the second form melting at 154–155° C.

A mixture of 5.0 g. of 1-trityloxy-2-acetamido-2-(6-quinoloyl)-ethane and 5.0 g. of aluminum isopropoxide in 80 ml. of dry isopropyl alcohol is subjected to slow distillation with occasional addition of more isopropanol until the distillate gives a negative test for acetone using dinitrophenylhydrazine reagent a quantity of celito is then added followed by 12 ml. of water. After removal of the solid the solvent is stripped off in vacuo and the resulting gum recrystallized from ethyl alcohol followed by ethyl acetate-petroleum ether giving D,L-erythro-O₃-trityl-1 - (6 - quinolyl) - 2 - acetamido - 1,3 - propanediol, M.P. 183–185° C.

A solution of 1.5 g. of D,L-erythro-O₃-trityl-1-(6-quinolyl)-2-acetamido-1,3-propanediol in 25 ml. of 2 N hydrochloric acid is heated at 100° C. for two hours. After removal of the triphenylcarbinol by filtration and extraction of the filtrate with ether, the aqueous solution is evaporated in vacuo to a syrup. This syrup is recrystallized from methanol giving D,L-erythro-1-(6-quinolyl)-2-amino-1,3-propanediol, M.P. 228° C. (dec.)

A solution of 500 mg. of the base in 50 ml. of methanol and 10 ml. of methyl dichloroacetate is heated at reflux for several hours, then reduced in volume to give the desired D,L-erythro dichloroacetamide.

What is claimed is:

1. A chemical compound having the formula:

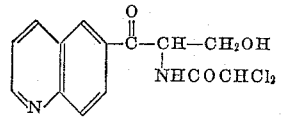

2. A chemical compound having the formula:

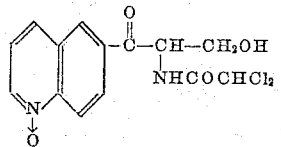

References Cited in the file of this patent

Moore, J. of the Am. Pharma. Assn., vol. 33, p. 200, July 1944.

Campbell et al., J. Am. Chem. Soc., vol. 68, p. 1838 (1946).

Feitelson et al., J. of Pharmacy and Pharmacology, vol. 3, pages 149–159 (1951).